United States Patent [19]
Vigier

[11] Patent Number: 5,826,231
[45] Date of Patent: Oct. 20, 1998

[54] METHOD AND DEVICE FOR VOCAL SYNTHESIS AT VARIABLE SPEED

[75] Inventor: Alain Vigier, Paris, France

[73] Assignee: Thomson - CSF, Puteaux, France

[21] Appl. No.: 882,215

[22] Filed: Jun. 25, 1997

Related U.S. Application Data

[63] Continuation of Ser. No. 774,080, Dec. 23, 1996, which is a continuation of Ser. No. 387,372, Feb. 13, 1995, which is a continuation of Ser. No. 65,497, May 24, 1993, abandoned.

[30] Foreign Application Priority Data

Jun. 5, 1997 [FR] France ................................... 92 06835

[51] Int. Cl.$^6$ ........................................................ G10L 9/14
[52] U.S. Cl. ........................... 704/262; 704/211; 704/219; 704/220
[58] Field of Search ..................................... 704/211, 219, 704/220, 262, 264, 265, 267, 268

[56] References Cited

U.S. PATENT DOCUMENTS

| 3,816,664 | 6/1974 | Koch | 395/2.2 |
|---|---|---|---|
| 3,975,763 | 8/1976 | Kitamura | 395/2.76 |
| 4,435,832 | 3/1984 | Asada et al. | 395/2.71 |
| 4,596,032 | 6/1986 | Sakurai | 395/2.2 |
| 4,709,390 | 11/1987 | Atal et al. | 395/2.71 |

FOREIGN PATENT DOCUMENTS

WO 91/06092  5/1991  WIPO .

*Primary Examiner*—David R. Hudspeth
*Assistant Examiner*—Susan Wieland
*Attorney, Agent, or Firm*—Oblon, Spivak, McClelland, Maier & Neustadt, P.C.

[57] ABSTRACT

A vocal synthesis method in which a speech signal is reconstituted by the selection from a dictionary of waveforms for the excitation of long-term and short-term predictive filters. To preserve, in the synthetic speech messages read at low speed or high speed, the same pitch and the same spectral characteristics as the messages read at normal speed, the period of excitation of the long-term predictive filter and the ranges of computation of both predictive filters are modified as a function of the speed of synthesis without modifying the values of pitch applied to the long-term predictor. Such a method may find application to dictaphones, telephone answering machines and vocal message systems.

12 Claims, 2 Drawing Sheets

METHOD AND DEVICE FOR VOCAL SYNTHESIS AT VARIABLE SPEED

This application is a continuation of application Ser. No. 8/744,080, filed on Dec. 23, 1996, which is a continuation of Ser. No. 08/387,372, filed on Feb. 13, 1995, which is a continuation of Ser. No. 08/065,497, filed on May 24, 1993, now abandoned.

BACKGROUND OF THE INVENTION

1. Field of the Invention

The present invention relates to a method and device for vocal synthesis at variable speed.

It can be applied more particularly to vocoders working at low bit rates.

2. Discussion of the Background

Many instruments such as dictaphones, telephone answering machines or vocal message systems are used to memorize vocal messages and subsequently to synthesize them at the convenience of the users.

A particularly valuable function of these instruments is that it can be made possible for them to synthesize messages recorded at a speed different from their nominal recording speed. A low speed can make it possible to take notes and a high speed can be used to get a glimpse of the contents of a message or to listen more quickly to the less important portions of a message.

When these functions are fulfilled in an analog manner, their drawbacks are that high-speed synthesis shifts the spectrum of the signal towards the high frequencies and the reconstituted voices are abnormally high-pitched while low-speed synthesis shifts the spectrum of the signal towards the low frequencies, resulting in abnormally low-pitched voices. At ratios where the speed is half or twice the nominal speed, these phenomena make the message wholly intelligible.

In systems for the digital synthesis of the speech signal, the synthesis is generally done by the excitation of long-term and short-term predictive filters by waveforms that are selected from a dictionary set up through a learning process. A temporal analysis of the speech signal then occurs by the extraction, from the speech signal, of the pitch of this speech signal during predetermined time intervals, of the order of 20 to 30 ms, and its segmentation into elements, of which some are duplicated and others eliminated. But the fact that certain parameters are eliminated or replaced by other parameters which are duplicated generally makes the restitution of the speech signal imperfect.

SUMMARY OF THE INVENTION

The aim of the invention is to overcome the above-mentioned drawbacks.

To this end, an object of the invention is a method for vocal synthesis at variable speed, according to which the signal is segmented into frames and sub-frames respectively comprising N and L speech samples and is reconstituted from a selection of waveforms in a dictionary during predetermined time intervals to excite long-term and short-term predictive filters, wherein the method include modifying the period of excitation of the long-term predictive filter and the ranges of computation of the predictive filters as a function of the speed of synthesis of the vocal signal without modifying the values of the pitch of the vocal signal applied to the long-term predictor.

The advantage of the method is that it can be used, by simple modifications of the synthesis device of the digital vocoders, to read a recorded message at variable speed. It also has another advantage in that it can be applied to all speech encoding systems working according to the principles of analysis by synthesis. It makes it possible inter alia to preserve, in the synthetic signal read at a different speed from its recording speed, the same pitch and the same spectral characteristics as those of the synthetic signal obtained for the nominal recording speed.

BRIEF DESCRIPTION OF THE DRAWINGS

Other features and advantages of the invention will appear from the following description, made with reference to the appended drawings, of which.

MORE DETAILED DESCRIPTION

Figure 1:
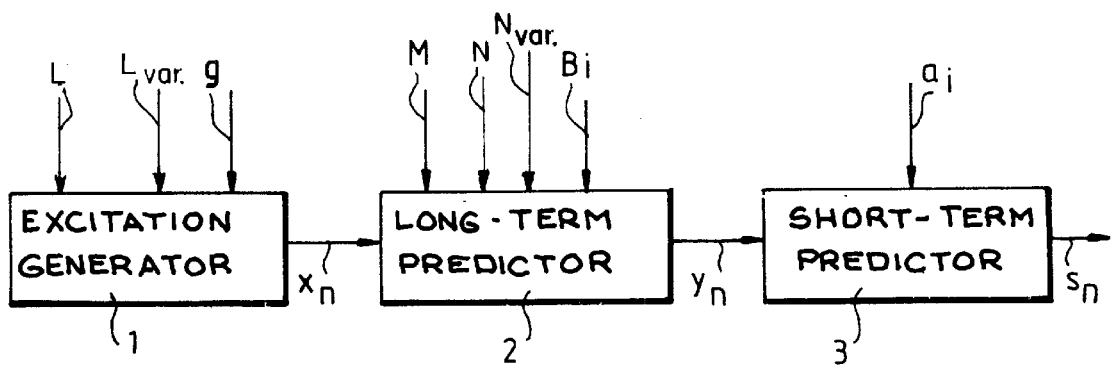
FIG. 1 shows a device for the synthesis of the speech signal.
Figure 2:
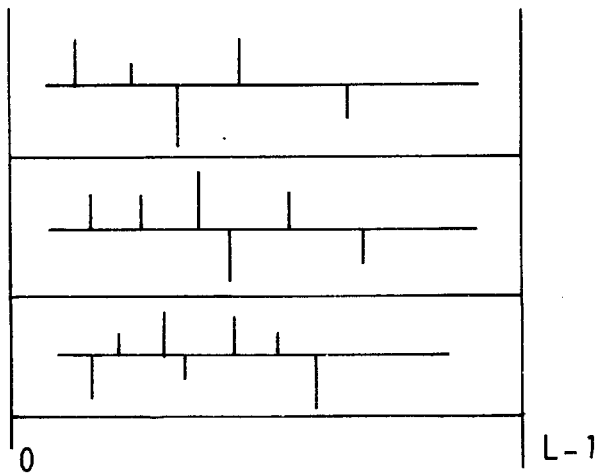
FIG. 2 shows the waveforms generated by the excitation generator of the device shown in FIG. 1.
Figure 3:
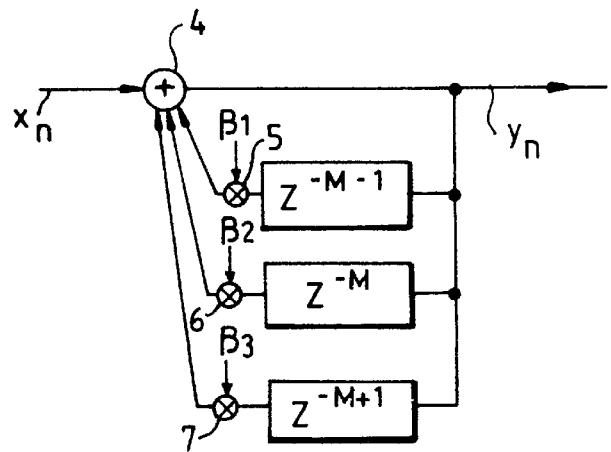
FIG. 3 shows a structure of a long-term predictive filter.

As is shown in FIG. 1, a device for the synthesis of a speech signal comprises, in a standard way, three modules formed by an excitation generator 1 followed by a long-term predictor 2 and a short-term predictor 3, these modules being series-connected in this order. The excitation generator 1 applies particular waveforms of the type shown in FIG. 2 to the input of the long-term predictor 2, for example at a rate of about 7.5 ms. The waveforms are contained in a dictionary. They represent voiced and unvoiced sounds of the speech signal. These waveforms, which are constituted by sequences of a determined number L of samples $e_n$ are multiplied by a coefficient g representing the energy of the speech signal. The samples $x_{(n)}$ obtained are converted by the long-term predictor 2 into samples $Y_{(n)}$ defined by a relationship having the form:

$$y_{(n)} = x_{(n)} + \beta_1 \cdot Y_{(n-M-1)} + \beta_2 \cdot y(n-M) + \beta_3 \cdot y_{(n-M+1)} \quad (1)$$

where M is a coefficient that characterizes the value of the pitch of the speech signal and $\beta_1$, $\beta_2$, $\beta_3$ are energy coefficients. A corresponding predictor comprises, as shown in FIG. 3 for example, an adder circuit 4 and three multiplier circuits 5, 6 and 7 to add the following products to each sample value $x_n$:

$$\beta_1 \cdot y_{(n-M-1)}, \beta_2 \cdot y_{(n-M)} \text{ et } \beta_3 \cdot y_{(n-M+1)}$$

Figure 4:
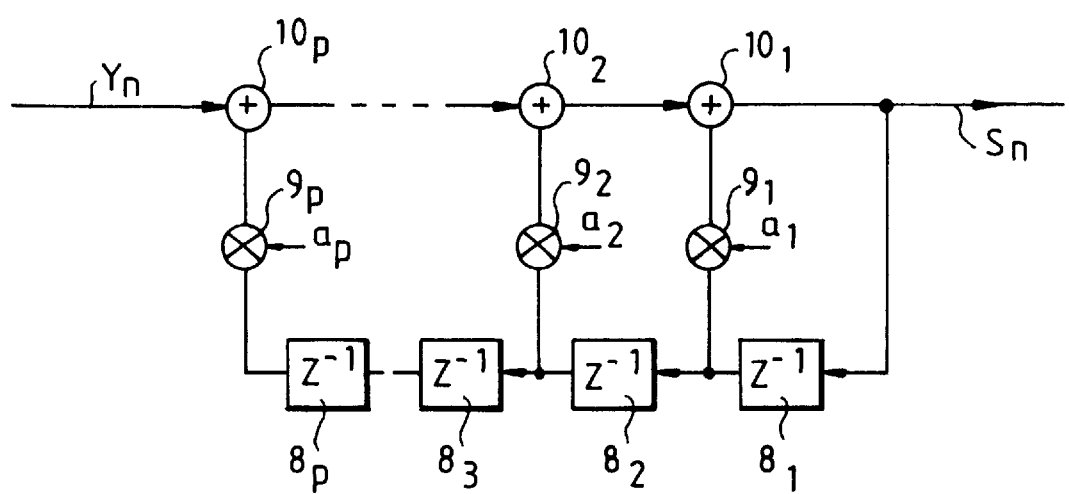
FIG. 4 shows a structure of a short-term predictive filter.

Finally, the synthetic signal $S_n$ of the speech signal is obtained by subjecting the samples $Y_n$ given by the long-term predictor to a transformation of the form:

$$S_{(n)} = y_{(n)} + \sum_{i=1}^{p} a_i \cdot S_{n-i} \quad (2)$$

where the coefficients $a_i$ represent the spectral parameters that enable the modelizing of the spectral properties of the speech signal. A corresponding predictor may be built by means of a recursive digital filter of the type shown in FIG. 4, comprising p series-connected registers $8_1$ to $8_p$, respectively coupled to p multiplier circuits $9_1$ to $9_p$ to obtain the products $a_i \cdot S_{n-i}$, and comprising p adder circuits to obtain the sum:

$$y_n + \sum_{i=1}^{p} a_i \cdot S_{n-i}.$$

Typically, for a segmentation of the speech signal into 30 ms frames during which the signal may be considered to be stationary, the waveforms $x_n$ given by the excitation generator 1 correspond to approximately 7.5 ms sub-frames of the speech signal and are updated at each sub-frame. The parameters $\beta_i$ of the long-term predictor 2 are also updated at each sub-frame, these parameters comprising typically 1 to 3 coefficients. The coefficients $a_i$ of the short-term predictor 3 which represent the spectral parameters of the speech signal are updated once per 30 ms frame. The method according to the invention includes modifying each of these three synthesis modules without having to modify the parameters of analysis characteristic of the message. It consequently makes it possible to synthesize the messages at a variable speed while, at the same time, preserving the pitch and the spectral properties of the signal. This is obtained by preserving the same segmentation of the signal into frames and sub-frames and the parameters computed on each frame while however modifying the initial size N of the number of samples of each initial frame so as to have frames of variable size $N_{var}$ and modifying the sub-frames with an initial size L so as to have variable sub-frames with a size $L_{var}$, in ensuring that the ratio $L_{var}/L$ is kept equal to the ratio $N_{var}/N$ and equal to r, where r is the variable speed rate. For r greater than 1, the speed will be low and for r smaller than 1, the speed will be high.

To do this, the excitation generator 1 delivers an excitation $e_n$ of n samples (n=0, L−1) that is chosen from a dictionary as a function of an excitation index. The excitation $e_n$ is modified so that, at initialization:

$e_{var(n)}=0$ for n=0 to $L_{var}$ −1, and so that, during the computation:

$e_{var}(NINT(rn))=e(n)$ for n=0 to L−1, wherein NINT is the nearest integer function.

This makes it possible to obtain an expansion of the excitation forms for r greater than 1 or a contraction for r smaller than 1. The same gain g is applied to the excitation: this gives, for each sub-frame, a signal with the form:

$X_{var}(n)=g\, e_{var}$ for $n=0$ to $L_{var}-1$

Similarly, the range of computation of the long-term predictor 2 is modified as a function of the index n which takes values of n equals zero to $L_{var}-1$ and the range of computation of the short-term predictor is modified by the modification of the index n of the value n equals zero to $N_{var}-1$. The method that has just been described thus makes it possible, by an adjustment of the computation range of the synthesis system, to read a message recorded at variable speed. The main modification comes into play in the excitation generator where an expansion or a contraction is applied to the excitation extracted from the dictionary. An alternative to this transformation may include making an interpolation for the low speeds and a decimation for a high speed of excitation. The method that has just been described may naturally be applied to any speech coding system working according to the principles of analysis by synthesis. It enables the synthetic signal read at a speed different from its recording speed to be kept at the same pitch and the same spectral characteristics as the synthetic signal obtained for the nominal recording speed.

What is claimed is:

1. A method for vocal synthesis at variable speed of a vocal signal comprising the steps of:

segmenting the vocal signal into frames and sub-frames;

selecting waveforms in a dictionary during predetermined time intervals to excite at least one long-term predictive filter and at least one short-term predictive filter by the vocal signal, said long-term predictive filter having coefficients that are updated each sub-frame and said short-term predictive filter having coefficients that are updated every frame;

first modifying a size $N_{var}$ of the frames and a size $L_{var}$ of the sub-frames with respect to an initial frame size N and an initial sub-frame size L, where N and L are integers, by a constant ratio r such that:

$$r = \frac{L_{var}}{L} = \frac{N_{var}}{N}$$

where r corresponds to the variable speed rate;

second modifying the size $L_{var}$ of the sub-frames and the size $N_{var}$ of the frames as a function of a speed of synthesis of the vocal signal without modifying a pitch of the vocal signal applied to the at least one long-term predictive filter.

2. The method according to claim 1, in the first modifying step wherein the initial frame size N is expanded to reduce the speed of synthesis and the initial frame size N is contracted to increase the speed of synthesis.

3. The method according to claim 2, wherein in the selecting step the dictionary comprises a plurality of waveforms $x_{(n)}$ and each waveform $x_{(n)}$ of the dictionary is converted into a signal $y_{(n)}$ output from the at least one long-term predictive filter according to the relationship:

$$y_{(n)}=x_{(n)}+\beta_1 y_{(n-M-1)}+\beta_2 y_{(n-M)}+\beta_3 y_{(n-M+1)} \tag{1}$$

where $\beta_1$, $\beta_2$, $\beta_3$ are energy coefficients, M is a coefficient that characterizes a value of the pitch of the vocal signal in which n takes the values of n=0 to L−1.

4. The method according to claim 3, wherein in the selecting step the signal $y_{(n)}$ output by the long-term predictor is converted into a signal $S_x$ according to the relationship:

$$S_x = y_{(n)} + \sum_{i=1}^{p} a_i \cdot S_{x-1}$$

according to which $a_i$ represents spectral parameters of modelization of the vocal signal and in which x takes the values of x=0 to $N_{var}-1$.

5. The method according to claim 1, wherein in the first modifying step an excitation sequence is either expanded for r>1 or contracted for r<1.

6. A device for the implementation of the method according to any one of claims 1 to 5 comprising an excitation generator, a long-term predictive filter and a short-term predictive filter coupled in this order in series, wherein the excitation generator gives an excitation signal of variable duration and the long-term predictive filter and short-term predictive filter have computation ranges that are variable as a function of the speed of synthesis of the vocal signal.

7. A method for vocal synthesis at variable speed of a vocal signal comprising the steps of:

segmenting the vocal signal into frames and sub-frames;

selecting waveforms in a dictionary during predetermined time intervals to excite at least one long-term predictive filter and at least one short-term predictive filter by the vocal signal, said long-term predictive filter having coefficients that are updated each sub-frame and said short-term predictive filter having coefficients that are updated every frame;

preserving a same segmentation of the vocal signal into the frames and sub-frames while first modifying a size $N_{var}$ of the frames and a size $L_{var}$ of the sub-frames with respect to an initial frame size N and an initial sub-frame size L, where N and L are integers, by a constant ratio r such that:

$$r = \frac{L_{var}}{L} = \frac{N_{var}}{N}$$

where r corresponds to the variable speed rate;

second modifying the size of $L_{var}$ of the sub-frames and the size $N_{var}$ of the frames as a function of a speed of synthesis of the vocal signal without modifying a pitch of the vocal signal applied to the at least one long-term predictive filter.

8. The method according to claim 7, wherein in the first modifying step the initial frame size N is expanded to reduce the speed of synthesis and the initial frame size N is contracted to increase the speed of the synthesis.

9. The method according to claim 8, wherein in the selecting step the dictionary comprises a plurality of waveforms $x_{(n)}$ and each waveform $x_{(n)}$ of the dictionary is converted into a signal $y_{(n)}$ output from the at least one long-term predictive filter according to the relationship:

$$y_{(n)} = x_{(n)} + \beta_1 y_{(n-M-1)} + \beta_2 y_{(n-M)} + \beta_3 y_{(n-M+1)} \tag{1}$$

where $\beta_1$, $\beta_2$, $\beta_3$ are energy coefficients, M is a coefficient that characterizes a value of the pitch of the vocal signal in which n takes the values of n=0 to $L_{var}-1$.

10. The method according to claim 9, wherein in the selecting step the signal $y_{(n)}$ output by the long-term predictor is converted into a signal $S_x$ according to the relationship:

$$S_x = y_{(n)} + \sum_{i=1}^{p} a_i \cdot S_{x-1}$$

according to which $a_i$ represents spectral parameters of modelization of the vocal signal and in which x takes the values of x=0 to $N_{var}-1$.

11. The method according to claim 7, wherein in the first modifying step an excitation sequence is either expanded for r>1 or contracted for r<1.

12. A device for the implementation of the method according to any one of claims 7 to 11 comprising an excitation generator, a long-term predictive filter and a short-term predictive filter coupled in this order in series, wherein the excitation generator gives an excitation signal of variable duration and the long-term predictive filter and short-term predictive filter have computation ranges that are variable as a function of the speed of synthesis of the vocal signal.

* * * * *

UNITED STATES PATENT AND TRADEMARK OFFICE
CERTIFICATE OF CORRECTION

PATENT NO.   : 5,826,231
DATED        : October 20, 1998
INVENTOR(S)  : Alain VIGIER It is certified that error appears in the above-identified patent and that said Letters Patent is hereby corrected as shown below:

On the title page, Item [30], the Foreign Application Data, is incorrect. It should read:

--Jun. 5, 1992    [FR]   France.............92 06835--

Signed and Sealed this

Eighteenth Day of May, 1999

Attest:

Q. TODD DICKINSON

Attesting Officer

Acting Commissioner of Patents and Trademarks